(12) United States Patent
Orf (10) Patent No.: US 8,287,194 B2
(45) Date of Patent: Oct. 16, 2012

(54) WEIGHTED MOUNTING ARRANGEMENT FOR, AND METHOD OF, STEADILY SUPPORTING A MOTION-SENSITIVE, IMAGE CAPTURE DEVICE

(75) Inventor: Hans Robert Orf, Simi Valley, CA (US)

(73) Assignee: The Tiffen Company LLC, Hauppauge, NY (US)

( * ) Notice: Subject to any disclaimer, the term of this patent is extended or adjusted under 35 U.S.C. 154(b) by 0 days.

(21) Appl. No.: 12/955,249

(22) Filed: Nov. 29, 2010

(65) Prior Publication Data
US 2011/0069947 A1    Mar. 24, 2011

Related U.S. Application Data

(63) Continuation-in-part of application No. 12/508,873, filed on Jul. 24, 2009, now Pat. No. 8,007,188.

(51) Int. Cl.
*G03B 17/00*    (2006.01)
*F16M 11/04*    (2006.01)

(52) U.S. Cl. ..................................... 396/419; 248/187.1

(58) Field of Classification Search ............. 396/12, 396/419, 421; 348/373, 376; 352/243; 248/325, 248/364, 558, 559, 177.1, 187.1
See application file for complete search history.

(56) References Cited

U.S. PATENT DOCUMENTS

| 5,187,744 A * | 2/1993 | Richter | 379/449 |
| 2010/0172642 A1 * | 7/2010 | Orf et al. | 396/421 |

\* cited by examiner

*Primary Examiner* — W. B. Perkey
*Assistant Examiner* — Minh Phan
(74) *Attorney, Agent, or Firm* — Kirschstein, et al.

(57) ABSTRACT

A weighted mounting arrangement stably supports a motion-sensitive, image capture device incorporated in a cellular telephone. The arrangement includes a handheld equipoising structure having a platform and a handle connected to the platform at a handle connection, a mount on the platform for holding the device during image capture, and a ballast weight mounted on the mount with the held device as an assembly. The assembly and the equipoising structure together have a combined center of gravity positioned in close adjacent proximity below the handle connection for balancing the arrangement during image capture.

9 Claims, 6 Drawing Sheets

WEIGHTED MOUNTING ARRANGEMENT FOR, AND METHOD OF, STEADILY SUPPORTING A MOTION-SENSITIVE, IMAGE CAPTURE DEVICE

This application is a continuation-in-part of U.S. patent application Ser. No. 12/508,873, filed Jul. 24, 2009, now U.S. Pat. No. 8,007,188.

BACKGROUND OF THE INVENTION

This invention generally relates to a weighted mounting arrangement for, and a method of, steadily supporting motion-sensitive, image capture devices, such as stand-alone image capture devices, e.g., ultra-lightweight cameras, web cameras and camcorders, as well as other multiple use devices, such as cellular telephones, personal digital assistants, media players, game controllers, and like devices in which image capture capability has been incorporated and, more particularly, relates to isolating all such devices from unwanted motion during image capture.

Still picture and motion picture (video) cameras have, at some time during their use, been handheld by a human operator whose inherent instability tended to produce blurred still and moving images. In recent years, ultra-lightweight cameras, such as web cameras weighing less than one pound, have been developed, and the current ultra-lightweight cameras are so compact and light that they have even been incorporated into other multiple use devices, such as cellular telephones, personal digital assistants, media players, game controllers and like handheld devices. In addition to the traditional unsteadiness of a handheld camera, these handheld devices were being operated by amateur photographers, still further resulting in unstable and often unacceptable still and video images, especially during ambulatory operation.

With the increasing popularity of handheld cellular telephones with built-in still and video image capture capability, it has become more and more desirable to rigidly support such handheld devices so that the images that they capture are stable and free from unwanted movement or vibration while the image is being acquired. Yet, the known handheld devices have not been directly integrated with the capability for such devices to be mounted onto industry standard camera and video equipment mounting platforms, such as tripods and/or equipoising supports. Hence, this readily available industrial equipment cannot be used to help stabilize and/or manipulate the handheld devices.

Current methods of holding/mounting such handheld devices have been geared towards non-image capture applications. For example, some handheld devices have been equipped with global positioning systems, and have been mounted in/on vehicles or other forms of transportation by adjustable mechanisms that allow the handheld devices to be desirably positioned along one or more axes relative to a mounting platform for convenient operation by, or orientation that faces, the user. These adjustable mechanisms typically incorporated a positionable tripod mount, a semi-rigid bendable gooseneck mount, a ball end swivel mount, or other types of multi-jointed or adjustable mechanism that was connected between the handheld device and the mounting platform.

As desirable as such adjustable mechanisms have been in non-image capture applications, they are not well suited for image capture applications. For example, the known adjustable mechanisms lacked the capability to rigidly fix and fixedly orient an image plane of the handheld device perpendicularly to the mounting platform. If the image plane was not perpendicular to the mounting platform, then an equipoising support would need to be operated at an undesirable off-axis orientation in order to obtain straight on or level images. As for tripods, level indicators would not be accurate with respect to the orientation of the image to be acquired. Existing multi-jointed or adjustable mechanisms have been prone to movement or vibration due to the flexible, movable nature of the multi-part construction. Such potential vibration or movement of the orientation of the device was detrimental to stable image capture, especially when the device was in motion or subjected to external forces, such as wind.

Thus, the known adjustable mechanisms have failed to effectively and satisfactorily eliminate the problems of instability encountered in connection with operation of the ever-lighter, digital, still and motion, cameras that have been developed, and it therefore is desirable to furnish a stabilized mounting arrangement particularly well suited to the special requirements of ultra-lightweight, handheld, digital devices, particularly consumer-operated video cameras and like devices, e.g., those incorporated into cellular telephones, personal digital assistants, media players, game controllers, and like handheld devices in which image capture capability has been incorporated.

SUMMARY OF THE INVENTION

One aspect of this invention is directed to a mounting arrangement for steadily and stably supporting a motion-sensitive, image capture device on a support, preferably an equipoising handheld structure. The device is operative for capturing an image over a field of view along an optical axis perpendicular to an image plane. The device may be a stand-alone image capture device, e.g., an ultra-lightweight camera, a web camera, a camcorder, etc., or may be a multiple use device, such as a cellular telephone, a personal digital assistant, a media player, a game controller, and like devices in which image capture capability has been incorporated.

The mounting arrangement includes a mount having a holder for holding the device during image capture, and a fixed base integral with, or connected to, the holder. The base is immovable relative to the holder and has a bottom surface that lays in a base plane perpendicular to the image plane when the base is supported by the support in a supported orientation. The base is operative for steadily positioning the holder and the device on the support in the supported orientation during the image capture. The capability of rigidly fixing the orientation or image plane of the handheld device with respect to the support avoids the capture of blurry images.

Advantageously, the holder has a plurality of arms for detachably gripping a periphery of the device. Preferably, the arms are constituted of a resilient material, such as synthetic plastic or metal. The arms are spaced away from, and do not block, the field of view, or interfere with any functions of the device, i.e., buttons, connector ports, battery replacement. The holder may be customized to hold one or more similar physical models of the device, or may be adapted to hold a plurality of different devices.

The base is advantageously provided with an insert having an internally threaded passage for threaded engagement with an externally threaded stud extending away from the support in the supported orientation during the image capture. The stud is preferably an industry standard ¼ inch-20 threaded mounting stud to enable the mount to be readily mounted on industry standard camera and video equipment mounting platforms, such as tripods and/or handheld equipoising supports.

The base is also advantageously provided with an anti-rotation index hole for receiving an index pin extending away from the support in the supported orientation during the image capture. This feature insures that the handheld device is mounted and maintained without rotation in the correct orientation with respect to the camera mounting equipment. Unwanted rotation or movement of the handheld device during abrupt movements or re-positioning of the equipment is prevented. The holder and the base may, but need not, be mirror symmetrical relative to a central plane. The insert and the index hole preferably lay in the central plane. The holder may also be designed such that it is off axis with respect to the base to accommodate special mounting requirements, or to align the optical centerline of the image capture device to the geometrical centerline of the mount.

The holder is provided with one or more integral weights for balance. Thus, a ballast weight is commonly mounted on the mount with the held device. The ballast weight, the mount and the held device together constitute an assembly having a total assembly weight at a center of gravity that is preferably offset from a geometric center of the mount. When the assembly is mounted during image capture on a platform of a handheld equipoising structure having a handle connected at a handle connection to the platform, the assembly and the equipoising structure together have a combined center of gravity that is positioned in close adjacent proximity below the handle connection for balancing the arrangement during image capture. Preferably, the handle is pivotably connected at a pivot axis to the platform, and the combined center of gravity is positioned about one-sixteenth of an inch or less vertically below the pivot axis.

The balanced mounting arrangement supports the device in a low mass, compact mounting profile. Without this capability, the mounting of the handheld device might prove difficult if it were used in conjunction with existing camera mounting equipment, such as environmental camera enclosures, SLR-type camera flash brackets, and the like. Tall mounts that are high in profile may also not be able to be balanced properly on equipoising support structures.

Still another aspect of this invention is directed to a method of stably supporting a motion-sensitive, image capture device, by connecting a handle at a handle connection to a platform of a handheld equipoising structure, mounting a mount for holding the device on the platform, mounting a ballast weight on the mount with the held device, and configuring the ballast weight, the mount, the held device and the equipoising structure with a combined center of gravity that is positioned in close adjacent proximity below the handle connection for balance during image capture.

Thus, the handheld devices are rigidly supported with balance such that the images that they capture are stable and free from unwanted movement or vibration while the image is being acquired. Readily available industrial equipment can be used to help stabilize and/or manipulate the handheld devices.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 4:
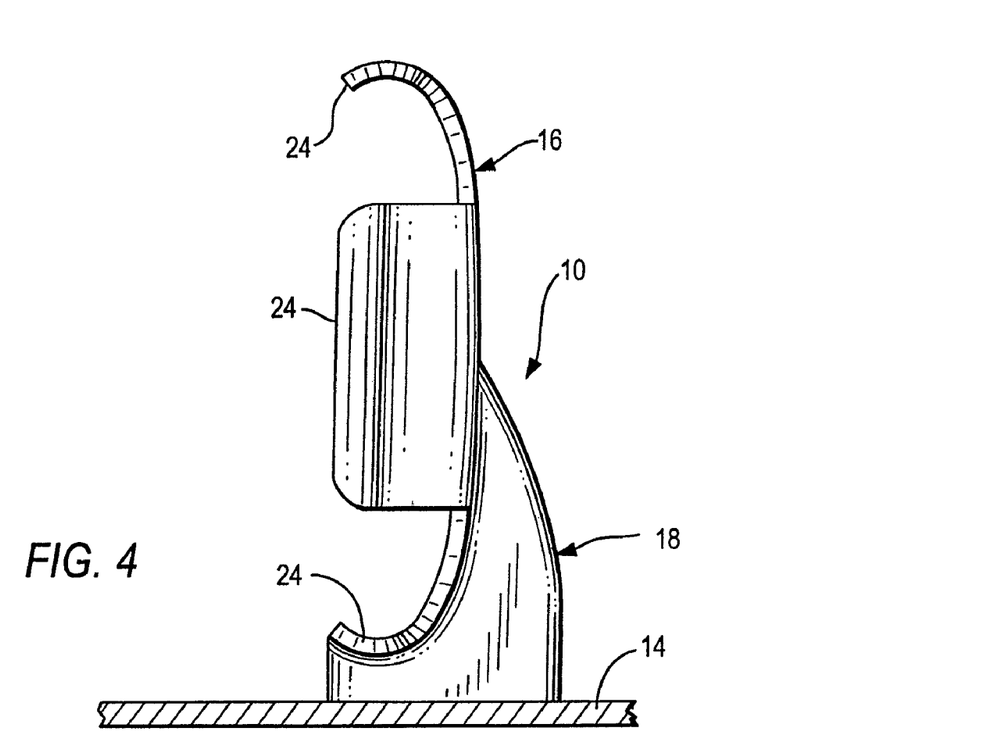
FIG. 4 is an upright side elevational view of the stabilized mount of FIG. 1 without the device.
Figures 5, 6, 7:
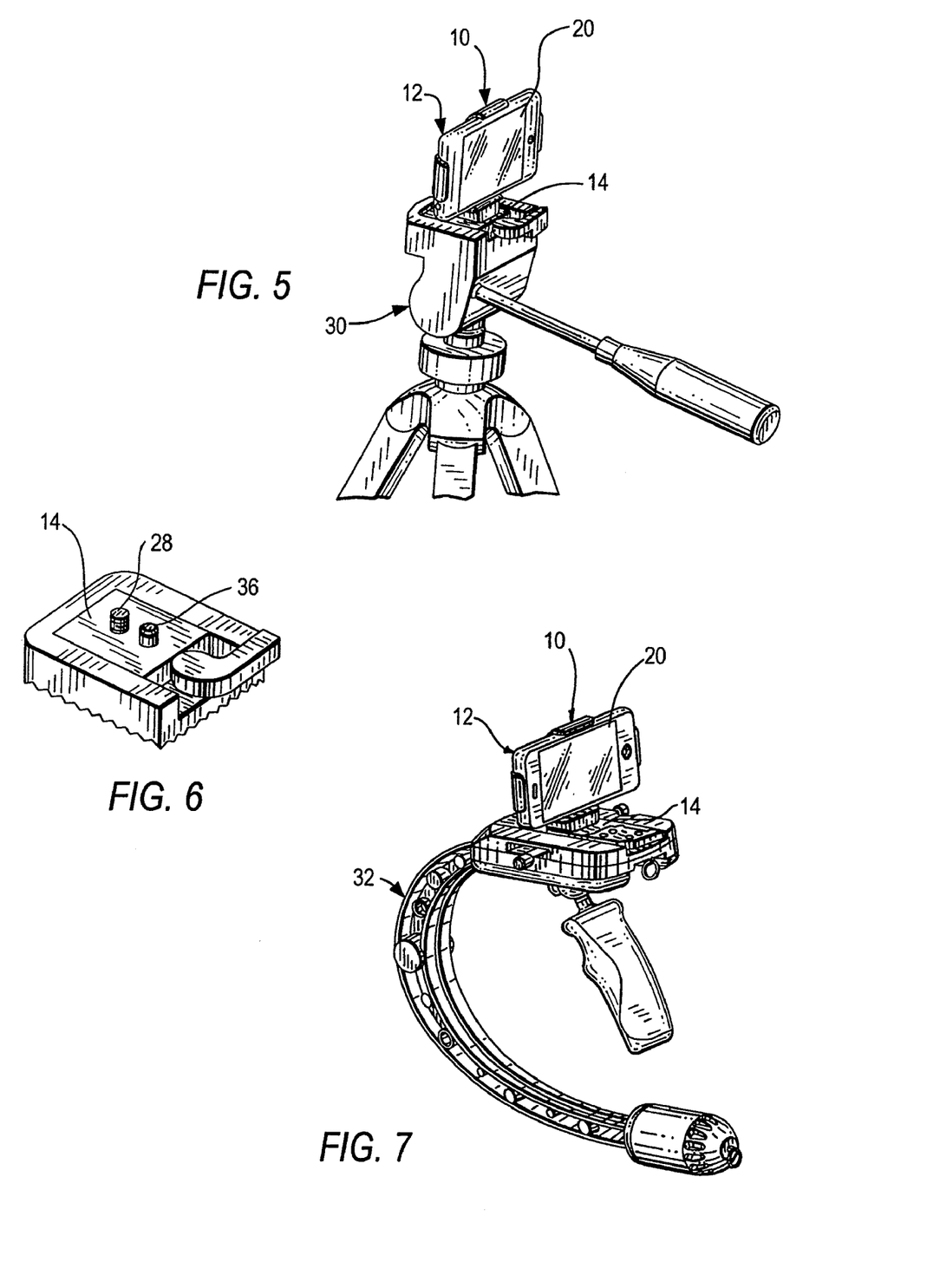
FIG. 5 is a reduced-scale, broken-away, perspective view of the stabilized mount of FIG. 1 on a tripod.
FIG. 6 is a perspective view of a detail of FIG. 5.
FIG. 7 is a reduced-scale, perspective view of the stabilized mount of FIG. 1 on an equipoising support structure.

Referring now to the drawings, reference numeral 10 generally identifies a stabilized mount of a mounting arrangement for steadily and stably supporting a motion-sensitive, image capture device 12 on a support 14 (see FIGS. 4-7). The device 12 is operative for capturing an image over a field of view along an optical axis perpendicular to an image plane. The device 12 may be a stand-alone image capture device, e.g., an ultra-lightweight camera, a web camera, a camcorder, etc., or may be a multiple use device, such as a cellular telephone, a personal digital assistant, a media player, a game controller, and like devices in which image capture capability has been incorporated. The support 14 is preferably a handheld equipoising structure (FIGS. 7, 14 and 15), but may be a tripod (FIG. 5), or a table or countertop (FIG. 4).

Figure 1:
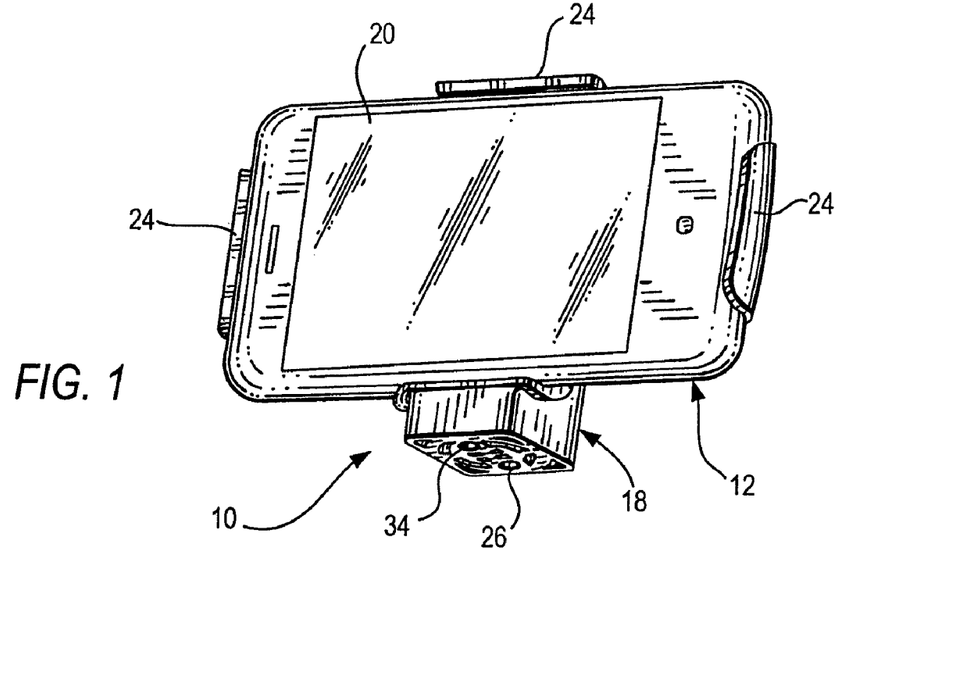
FIG. 1 is a front perspective view of one embodiment of a stabilized mount in which a multiple use, handheld device is held.
Figure 2:
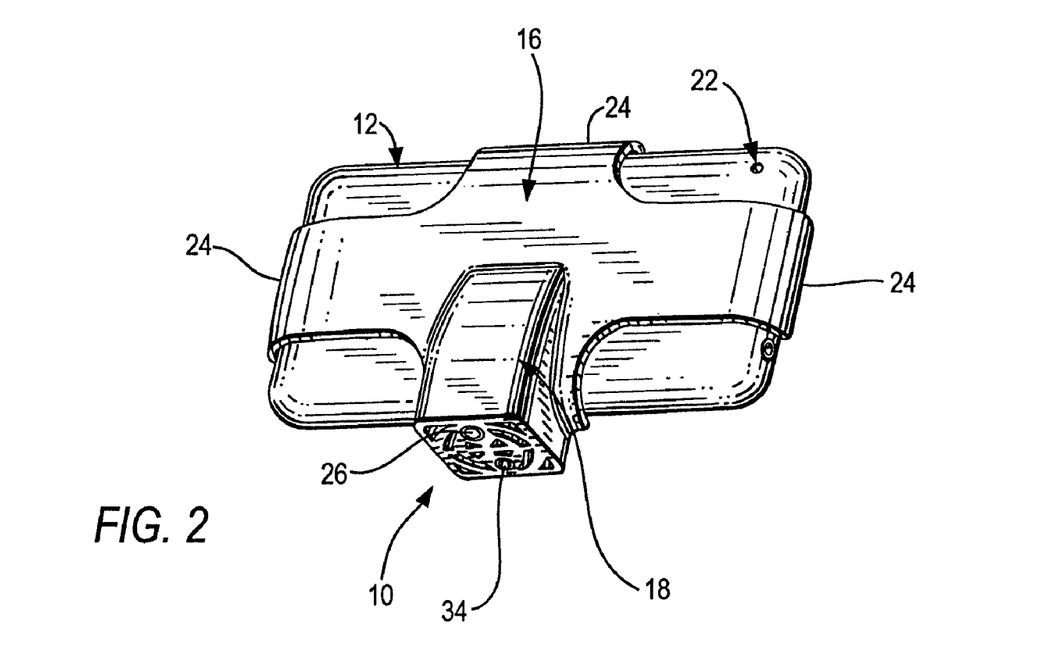
FIG. 2 is a rear perspective view of the stabilized mount of FIG. 1 in which the device is held.
Figure 3:
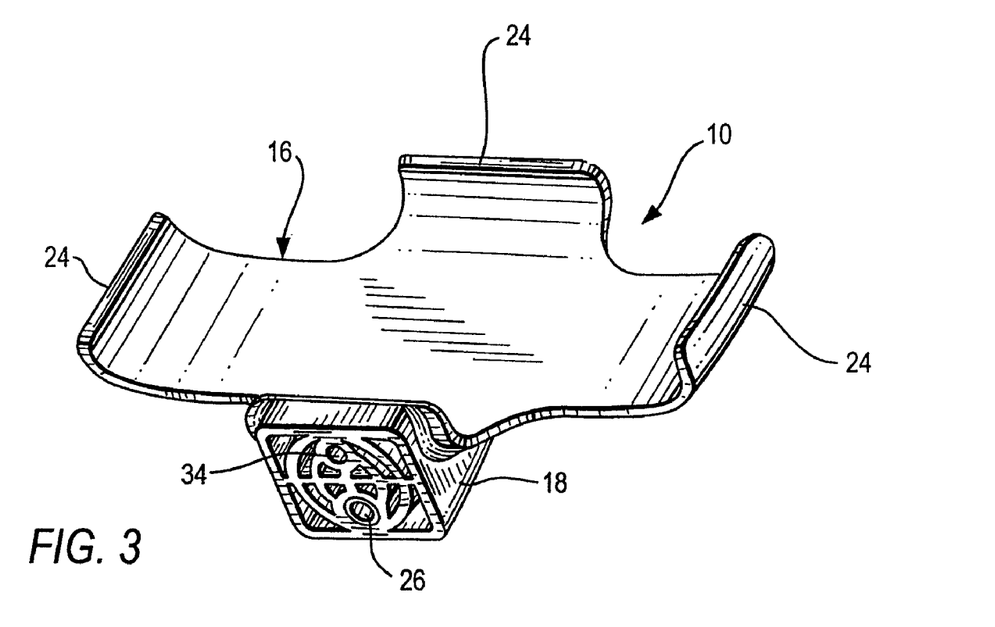
FIG. 3 is a front perspective view of the stabilized mount of FIG. 1 without the device.

As illustrated in FIGS. 1-2, the device 12 is an iPhone, which is a multimedia smartphone marketed by Apple, Inc. This device 12 has an internal solid-state imager having a two-dimensional array of cells or photosensors arranged in the image plane. The photosensors correspond to image elements or pixels in a field of view of the imager. The imager may be a charge coupled device (CCD) or a complementary metal oxide semiconductor (CMOS) device, together with associated bandpass spectral filters and electronic circuits for producing electrical signals corresponding to a two-dimensional array of pixel information over the field of view. This device 12 also has a viewfinder display 20 that is parallel to the image plane, as well as an aperture 22 (see FIG. 2) through which light passes to the imager.

The mount 10 includes a holder 16 for holding the device 12 during image capture, and a fixed base 18 integral with, or connected to, the holder 16. The base 18 is immovable relative to the holder 16 and has a bottom surface that lays in a base plane perpendicular to the image plane when the base 18 is supported by the support 14 in a supported orientation. The base 18 is operative for steadily positioning the holder 16 and the device 12 on the support 14 in the supported orientation during the image capture. The capability of rigidly fixing the orientation or image plane of the handheld device 12 with respect to the support 14 avoids the capture of blurry images.

Advantageously, the holder 16 has a plurality of four arms 24 for detachably gripping a periphery of the device 12. The arms 24 grip upper, lower and opposite side edges of the device 12 and clamp the device 12 in place. Preferably, the arms 24 are curved at their ends and are constituted of a resilient material, such as synthetic plastic or metal, that yield to enable the device 12 to be snap-fitted to the holder 16. The arms 24 are spaced away from the aperture 22, and do not block or obstruct the field of view, or interfere with any functions of the device 12, e.g., buttons, connector ports, battery replacement. The holder 16 may be customized to hold one or more similar physical models of the device 12, or may be adapted to hold a plurality of different devices 12. The customized mount 10 can be sold separately from, or in conjunction with, a specific model of the device 12. The holder 16 may be provided with one or more integral weights for balance, as described below in connection with FIGS. 8-15.

The base 18 is advantageously provided with an insert 26 having an internally threaded passage for threaded engagement with an externally threaded stud 28 (see FIG. 6) extending away from the support 14 in the supported orientation during the image capture. The stud 28 is preferably an industry standard ¼ inch-20 threaded mounting stud to enable the mount 10 to be readily mounted on industry standard camera and video equipment mounting platforms, such as tripods 30 (see FIG. 5) and/or equipoising support structures 32 (see FIGS. 7, 14 and 15).

The base 18 is also advantageously provided with an anti-rotation index hole 34 for receiving an index pin 36 (see FIG. 6) extending away from the support 14 in the supported orientation during the image capture. This feature insures that the handheld device 12 is mounted and maintained without rotation in the correct orientation with respect to the camera mounting equipment 30, 32. Unwanted rotation or movement of the handheld device 12 during abrupt movements or re-positioning of the equipment 30, 32 is prevented. The holder 16 and the base 18 are illustrated as, but need not be, mirror symmetrical relative to a central plane, and the insert 26 and the index hole 34 preferably lay in the central plane. The insert 26 and the index hole 34 are mutually arranged in a predetermined relationship that matches that of the stud 28 and the index pin 36. The holder 16 may also be designed such that it is off axis with respect to the base 18 to accommodate special mounting requirements, or to align the optical centerline of the device 12 to the geometrical centerline of the mount 10.

The mount 10 supports the device 12 as an assembly in a low mass, compact mounting profile. Without this capability, the mounting of the handheld device 12 might prove difficult if it were used in conjunction with existing camera mounting equipment, such as environmental camera enclosures, SLR-type camera flash brackets, and the like. Tall mounts that are high in profile may also not be able to be balanced properly on equipoising support structures.

Figures 8, 9, 10:
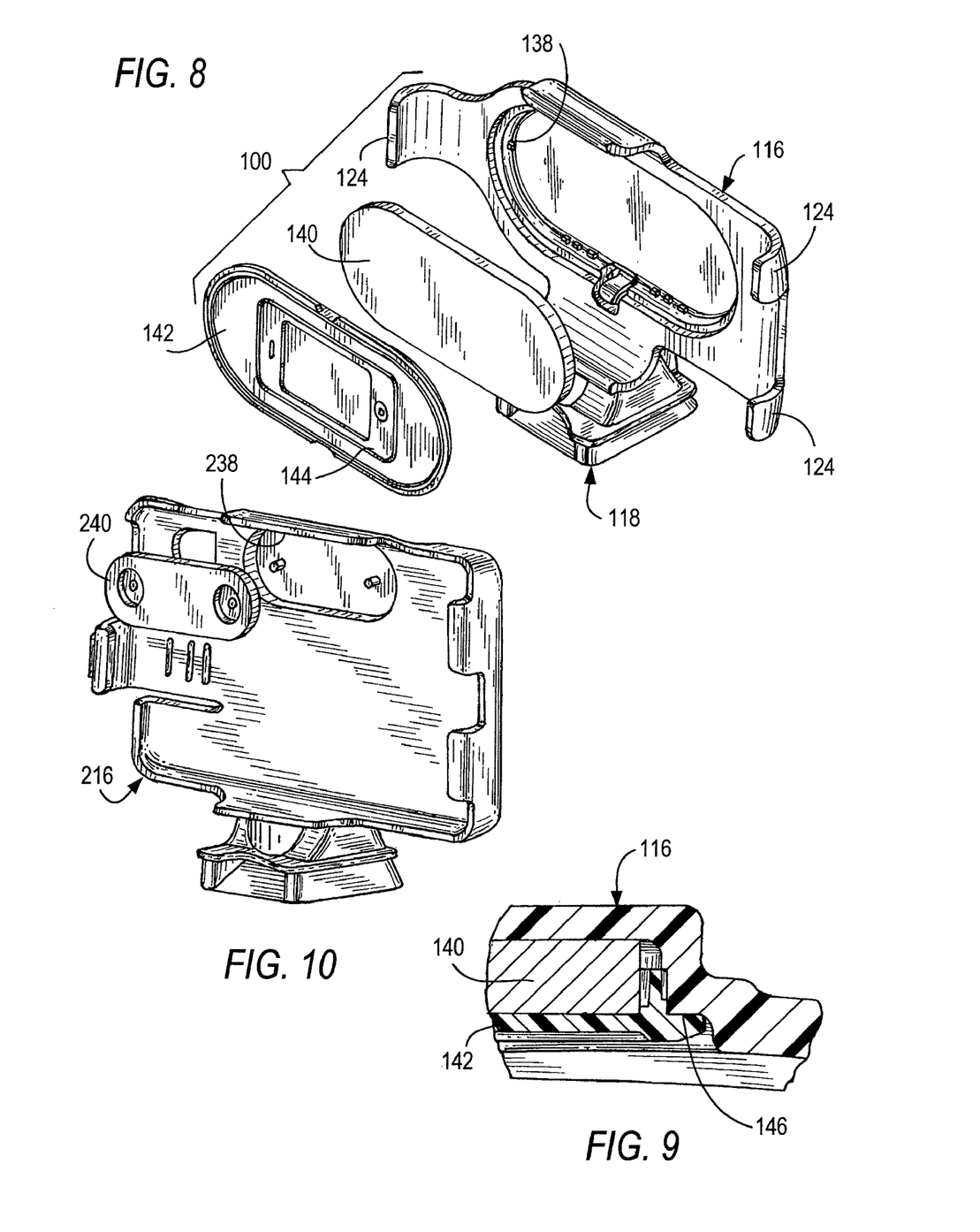
FIG. 8 is an exploded, perspective view of another embodiment of a stabilized weighted mount in which a multiple use, handheld device is held in an assembly in accordance with this invention.
FIG. 9 is an enlarged sectional view of a detail of FIG. 8.
FIG. 10 is an exploded, perspective view of still another embodiment of a stabilized weighted mount in accordance with this invention.

FIG. 8 depicts another embodiment of a stabilized mount 100, similar to mount 10, and includes a holder 116 for holding the device 12 as an assembly during image capture, and a fixed base 118 integral with, or connected to, the holder 116. Advantageously, the holder 116 has a plurality of five arms 124 for detachably gripping a periphery of the device 12. The arms 124 grip upper, lower and opposite side edges of the device 12 and clamp the device 12 in place. Preferably, the arms 124 are curved at their ends and are constituted of a resilient material, such as synthetic plastic or metal, that yield to enable the device 12 to be snap-fitted to the holder 116 by snap action. The arms 124 do not block or obstruct the field of view, or interfere with any functions of the device 12, e.g., buttons, connector ports, battery replacement. The base 118 is advantageously provided with an insert, analogous to the insert 26 having an internally threaded passage, and an anti-rotation index hole, analogous to the anti-rotation index hole 34.

As best seen in FIG. 8, the holder 116 is formed with a cavity 138 in which at least one ballast weight 140 is accommodated. A cover 142 overlies the ballast weight 140 and, as shown in FIG. 9, the cover 142 is ultrasonically welded at region 146 to the holder 116, or is mounted in the cavity 138 by snap action or by a fastener. Preferably, the cavity 138 and the ballast weight 140 are of complementary contour. Additional ballast weights can be used. Advantageously, the cover 142 bears a graphic 144 that instructs a user how to correctly align and position the device 12 relative to the holder 116. The holder 116 is customized to hold a single physical model of the device 12.

As best seen in FIG. 10, still another embodiment of a stabilized mount, similar to mount 10, includes a holder 216 customized to hold a single physical model of a different image capture device as an assembly. The holder 216 is formed with a cavity 238 in which at least one ballast weight 240 is accommodated. The weight 240 has a pair of mounting holes that align with mounting posts in the cavity 238. A cover may overlie the weight 240.

Different image capture devices 12, e.g., smartphones, have different configurations and different weights and weight distributions. When such devices 12 are held in their respective different holders, their total assembly weights and weight distributions are also different, and they have different centers of gravity (mass). If it is desired to interchangeably mount such differently held devices on the same support, such as the handheld equipoising support structure 132 depicted in FIGS. 14 and 15, then the centers of gravity of such differently held devices must be precisely located such that the combined center of gravity of the overall arrangement is precisely positioned at a specific location for proper balance. As explained below, this specific location is in close adjacent proximity below a handle connection at which a handle is connected to a platform of the equipoising support structure 132. Preferably, the handle is pivotably connected at a pivot axis to the platform, and the combined center of gravity is positioned about one-sixteenth of an inch or less vertically below the pivot axis. The different weights and placement of the ballast weights 140 and 240 in FIGS. 8 and 10 represent one way to locate the centers of gravity of such differently held devices. Also, the graphic 144 on the cover 142 represents another way to control the weight distribution by insuring that the device 12 is always positioned in the same orientation on its holder.

Figure 11:
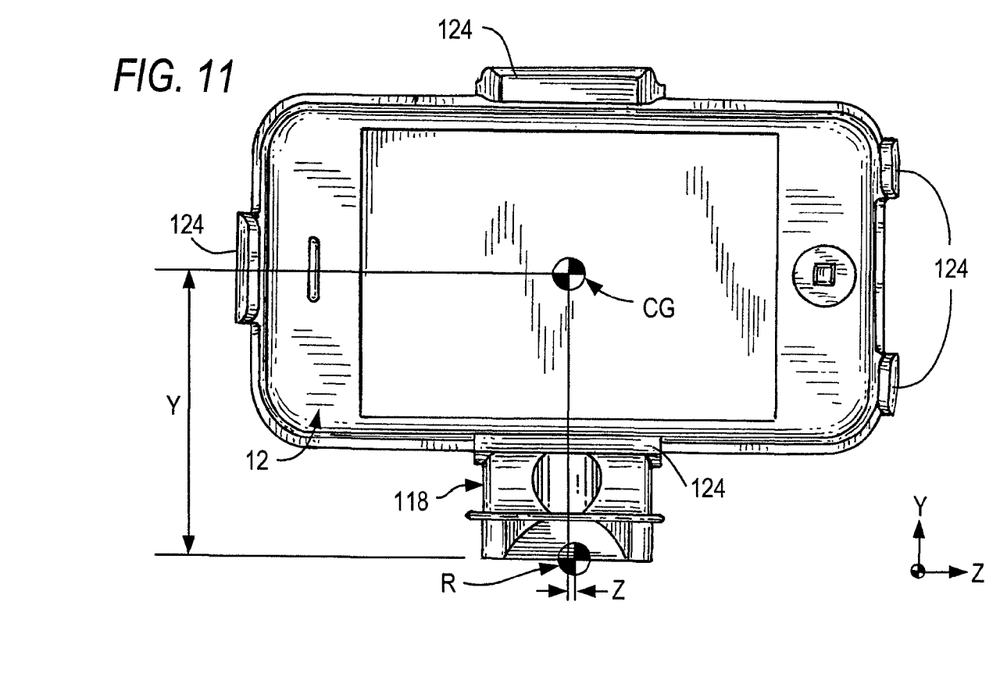
FIG. 11 is a front elevational view of the assembly of FIG. 8 depicting the location of the center of gravity of the assembly.
Figure 12:
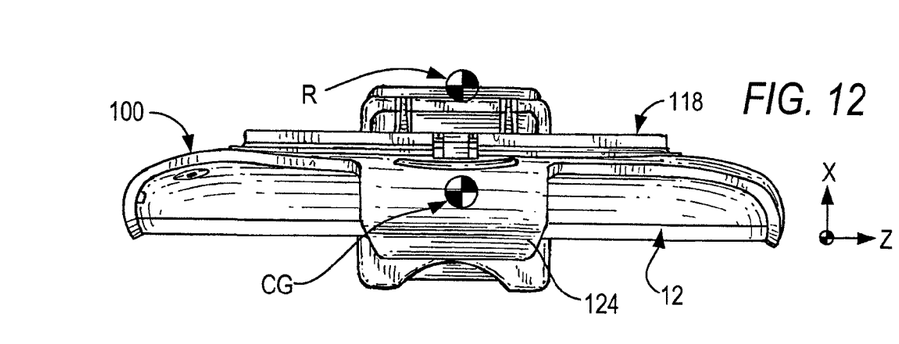
FIG. 12 is a top plan view of FIG. 11.
Figure 13:
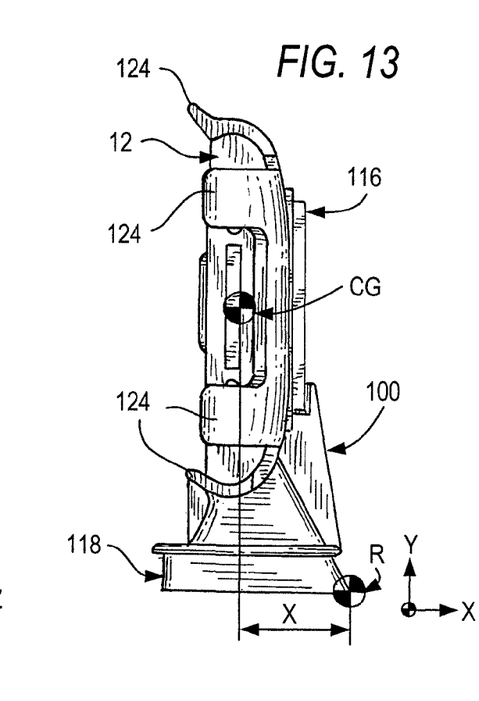
FIG. 13 is a right side elevational view of FIG. 11.

FIGS. 11-13 depict the assembly of the device 12 held in the holder 116. Coordinate X, Y, Z axes are shown in each figure. For ease of reference, the bottommost, rearmost, central point on the assembly is identified as a reference point R. The center of gravity CG of the assembly is shown in each figure relative to the reference point R. The displacement X along the X-axis, the displacement Y along the Y-axis, and the displacement Z along the Z-axis are separately shown relative to the reference point R. It will be noted that the center of gravity CG of the assembly is not located at the geometrical center of the mount. Thus, the position of the center of gravity CG of the assembly is a fixed, known location and, as described above, the total weight of the assembly at that center of gravity CG is also fixed and known.

Figure 14:
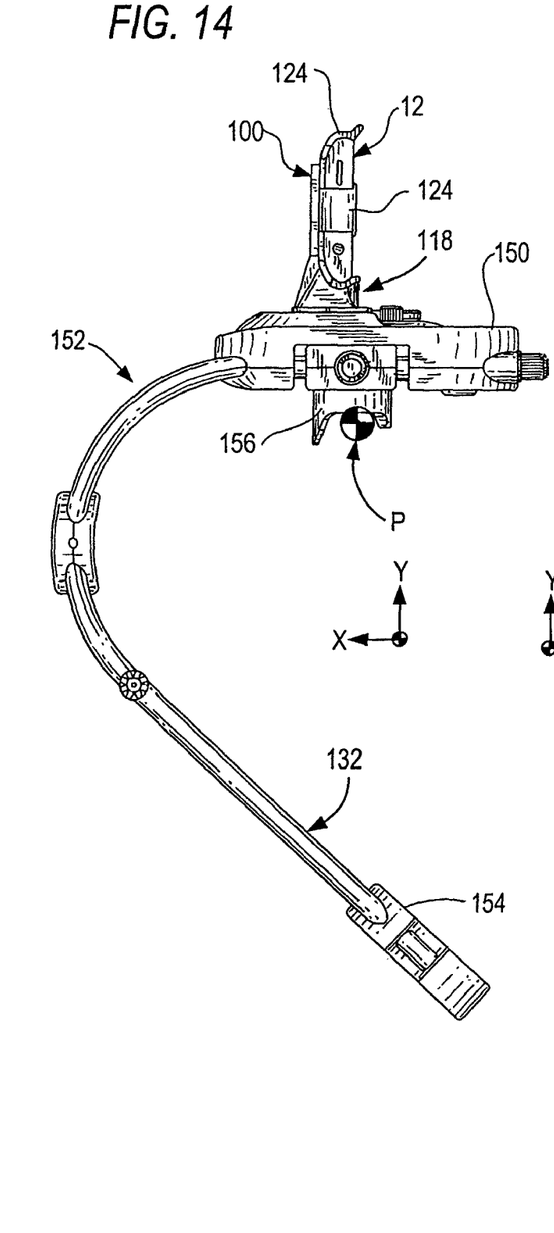
FIG. 14 is a left side elevational view of a stabilized weighted mounting arrangement in which the assembly of FIG. 8 is mounted on an equipoising support structure, and depicting a combined center of gravity of the overall arrangement.
Figure 15:
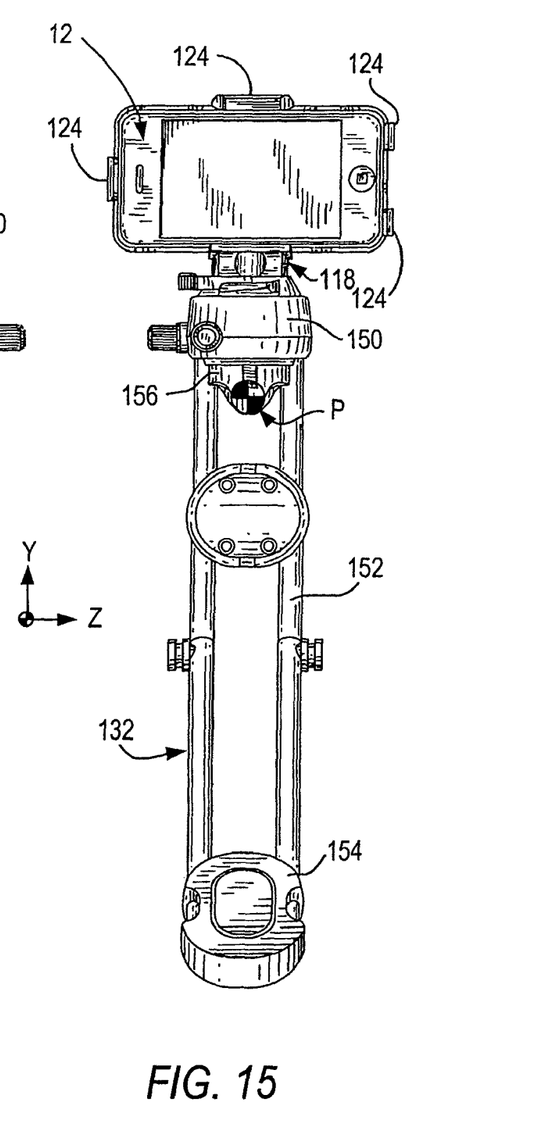
FIG. 15 is a right side elevational view of FIG. 14.

FIGS. 14-15 depict the aforementioned handheld equipoising support structure 132 having a platform 150, a curved arm 152 having a large radius of curvature, a bottom counterweight 154, and a handle connector 156. A handle for gripping by a user is not illustrated to simplify the drawings, but it will be understood that the handle is pivotably connected to the platform 150 via the connector 156 at a pivot axis. Coordinate X, Y, Z axes are shown in each figure. The center of gravity of the equipoising support structure 132 by itself is well below the platform 150, e.g., about midway between the platform 150 and the bottom counterweight 154. When the assembly is mounted on the equipoising support 132, then the combined center of gravity P of the assembly and the equipoising support structure 132 is raised toward the platform 150. The known position of the center of gravity CG of the assembly and the known weight distribution of the assembly are selected so as to position the combined center of gravity P in close adjacent proximity below the handle connection or pivot axis, as shown. Preferably, the combined center of gravity P is positioned about one-sixteenth of an inch or less vertically below the pivot axis or vertical balance point of the arrangement. The combined center of gravity P lies along, i.e., is coincident with, the Y-axis, and is not displaced along the X-axis or the Z-axis for proper balance. At distances greater than about one-sixteenth of an inch, the bottom counterweight 154 may tend to swing the arrangement as a pendulum during rapid hand movement by an operator. Should a different assembly, e.g., a different device held in the mount of FIG. 10, be mounted on the equipoising support structure 132, then proper balance is again assured due to the advance known positioning and known weight distribution of its center of gravity CG.

It will be understood that each of the elements described above, or two or more together, also may find a useful application in other types of constructions differing from the types described above.

While the invention has been illustrated and described as embodied in a weighted mounting arrangement for stably supporting a motion-sensitive, image capture device on a support, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A weighted mounting arrangement for stably supporting a motion-sensitive, image capture device, the arrangement comprising:
    a handheld equipoising structure having a platform and a handle connected to the platform at a handle connection;
    a mount on the platform for holding the device during image capture, the mount including a holder having a cavity laterally offset and behind the held device, and a plurality of arms for detachably gripping a periphery of the device, and a base that is supported by the equipoising structure; and
    a ballast weight mounted in the cavity on the mount with the held device as an assembly, the assembly and the equipoising structure together having a combined center of gravity positioned in close adjacent proximity vertically below the handle connection for balancing the arrangement during image capture.

2. The weighted mounting arrangement of claim 1, wherein the mount includes a cover overlying the ballast weight and connected to the holder.

3. The weighted mounting arrangement of claim 1, wherein the holder is customized to hold a single physical model of the device.

4. The weighted mounting arrangement of claim 1, wherein the assembly has a center of gravity that is offset from a geometric center of the mount.

5. A weighted mounting arrangement for stably supporting different models of motion-sensitive, image capture devices, the arrangement comprising:
    a handheld equipoising structure having a platform and a handle connected to the platform at a handle connection;
    a first mount for holding a first model of the devices during image capture, the first mount including a first holder having a first cavity laterally offset and behind the first model, and a first plurality of arms for detachably gripping a periphery of the first model, and a first base;
    a first ballast weight mounted in the first cavity on the first mount with the held first model as a first assembly;
    a second mount different from the first mount, for holding a second model of the devices during image capture, the second mount including a second holder having a second cavity laterally offset and behind the second model, and a second plurality of arms for detachably gripping a periphery of the second model, and a second base;
    a second ballast weight different from the first ballast weight and mounted in the second cavity on the second mount with the held second model as a second assembly;
    either one of the assemblies being mounted, and supported by the first and second bases, on the equipoising structure; and
    the mounted one assembly and the equipoising structure together having a combined center of gravity positioned in close adjacent proximity vertically below the handle connection for balancing the arrangement during image capture.

6. A method of stably supporting a motion-sensitive, image capture device, the method comprising the steps of:
    connecting a handle at a handle connection to a platform of a handheld equipoising structure;
    mounting a mount for holding the device on the platform by detachably gripping a periphery of the device with a plurality of arms;
    configuring a cavity in the mount that is laterally offset from and behind the held device;
    mounting a ballast weight in the cavity on the mount with the held device as an assembly; and
    configuring the assembly and the equipoising structure with a combined center of gravity that is positioned in close adjacent proximity vertically below the handle connection for balance during image capture.

7. The method of claim 6, and overlying the ballast weight with a cover.

8. The method of claim 6, wherein the holding step is performed by holding a single physical model of the device.

9. The method of claim 6, and configuring the assembly with a center of gravity that is offset from a geometric center of the mount.

* * * * *